Sept. 21, 1943. J. JETSECK ET AL 2,330,186
VENDING MACHINE
Filed June 9, 1941 9 Sheets-Sheet 1
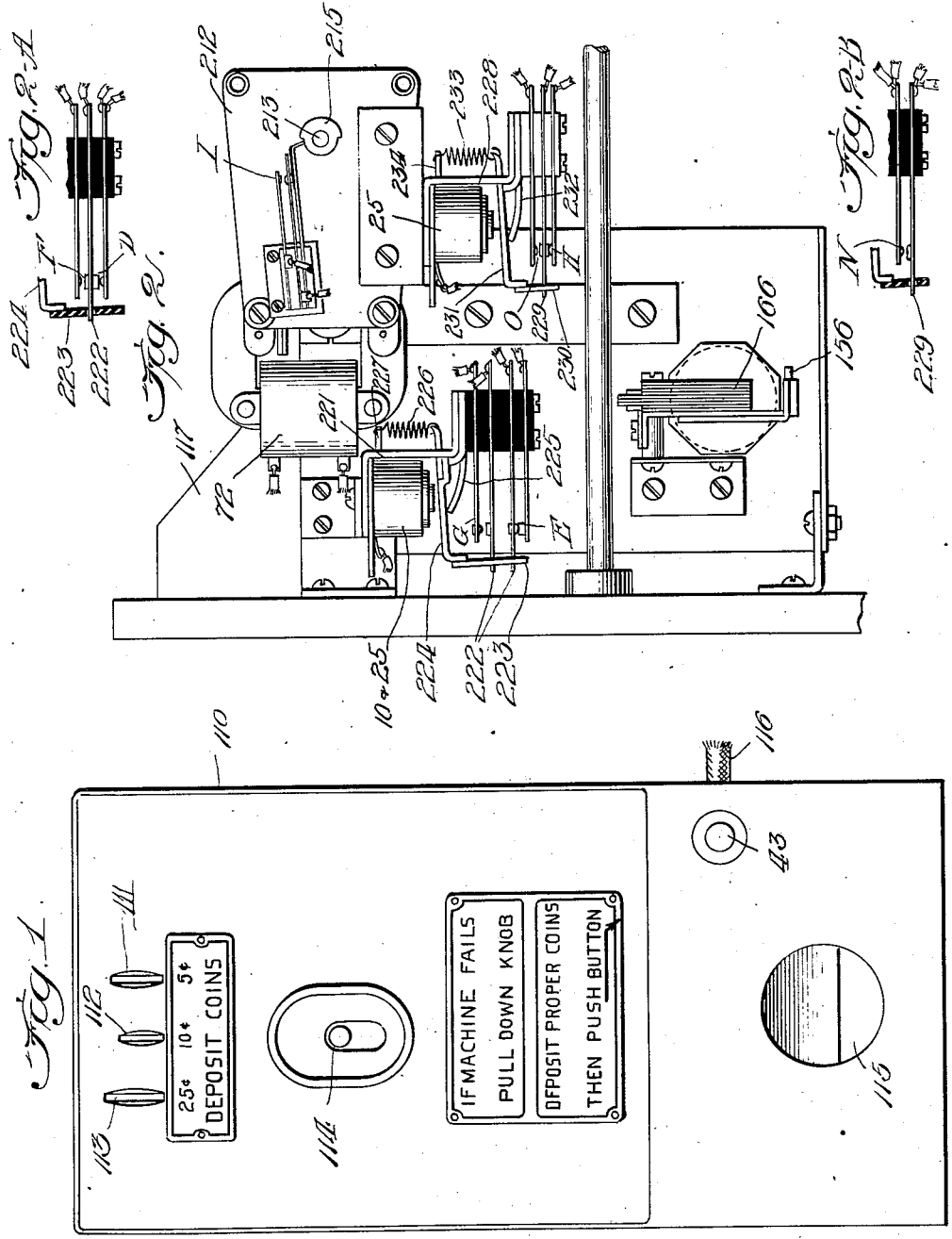

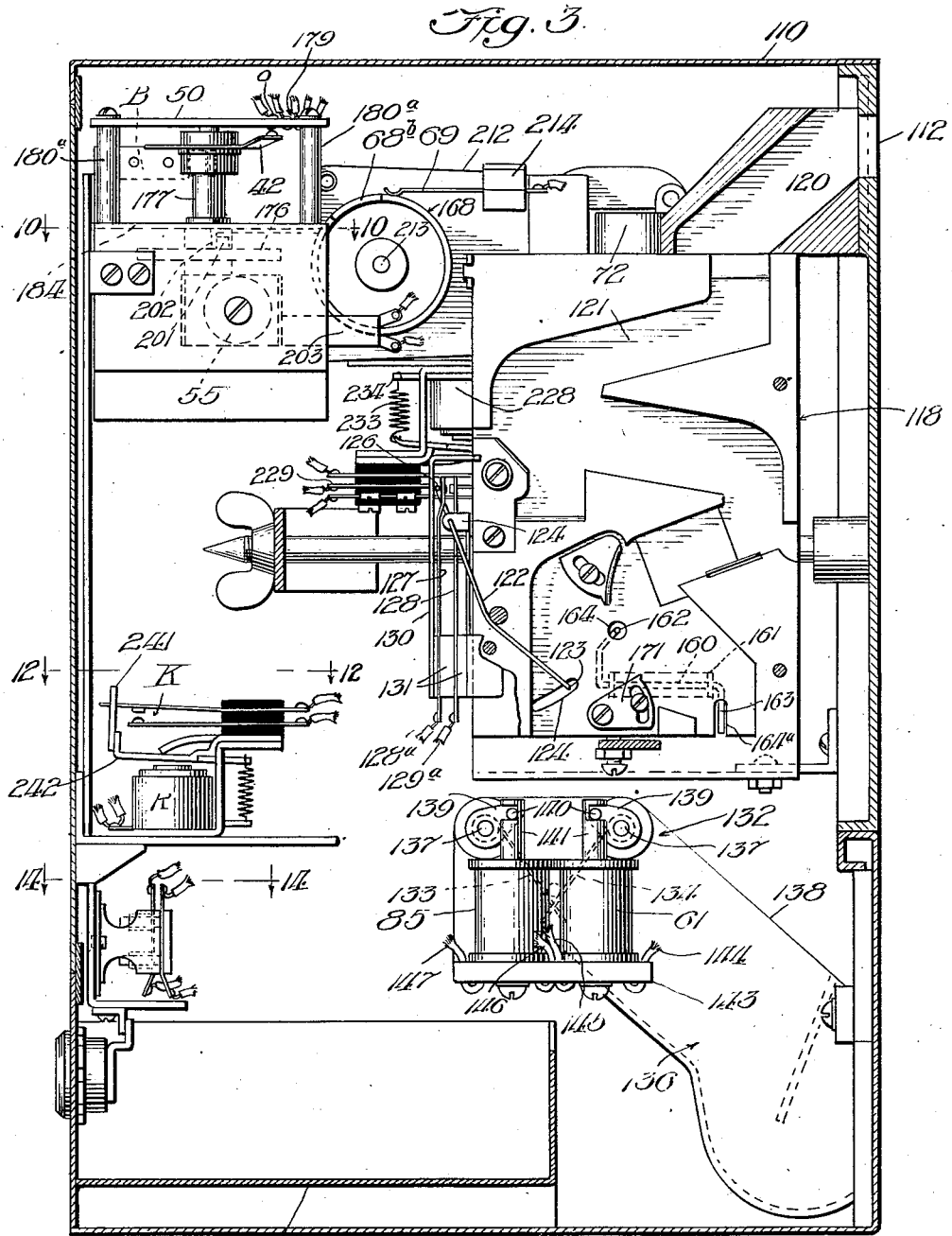

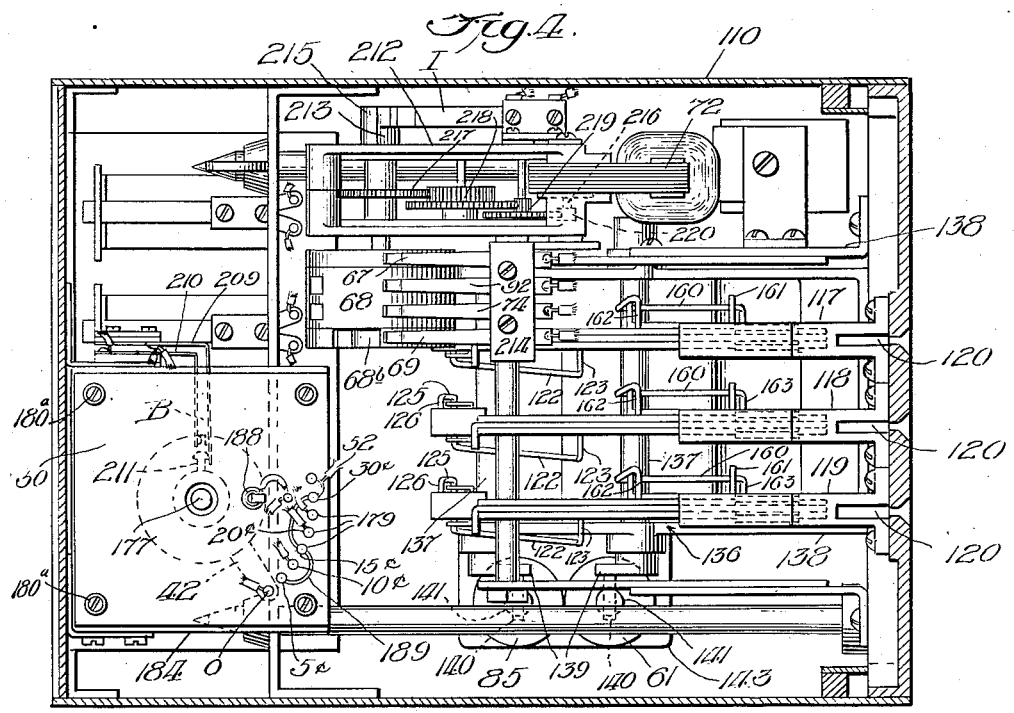
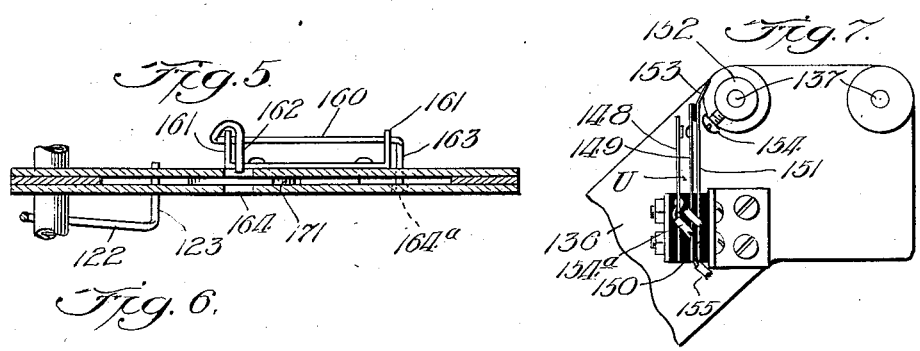
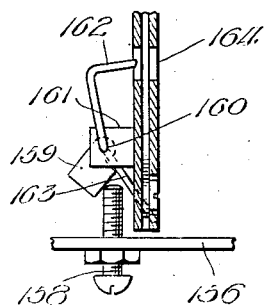
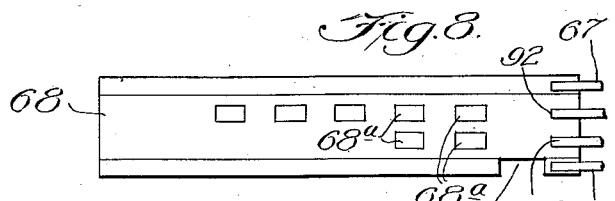

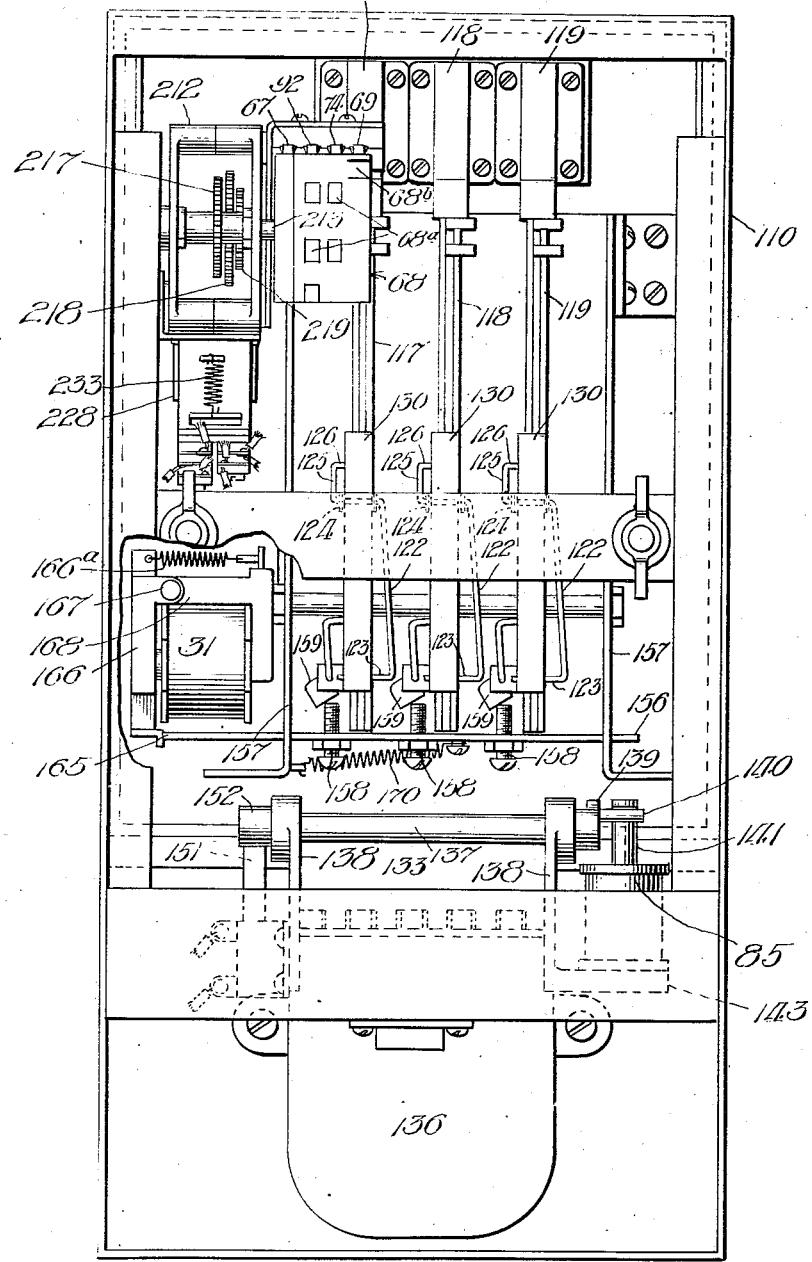

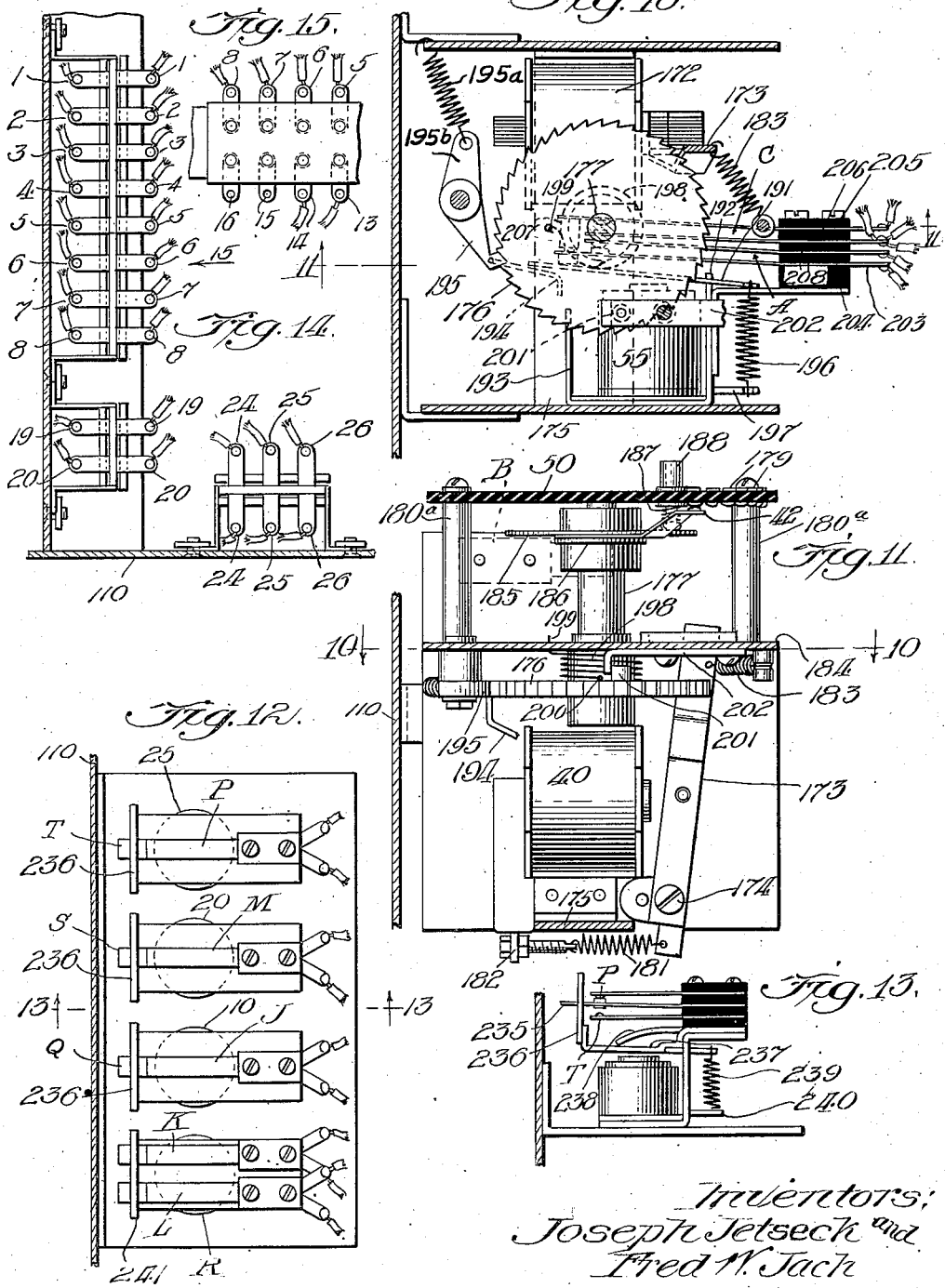

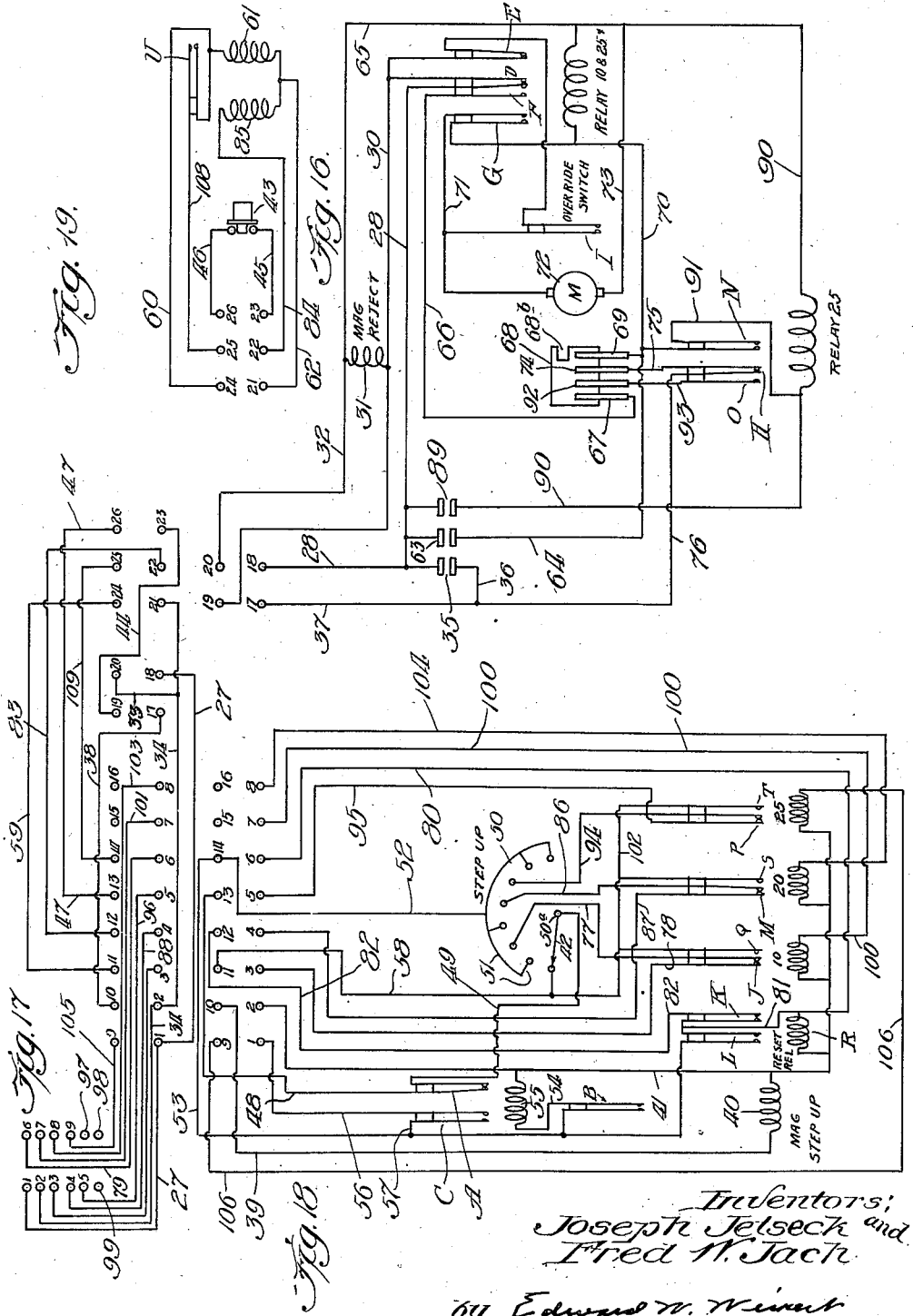

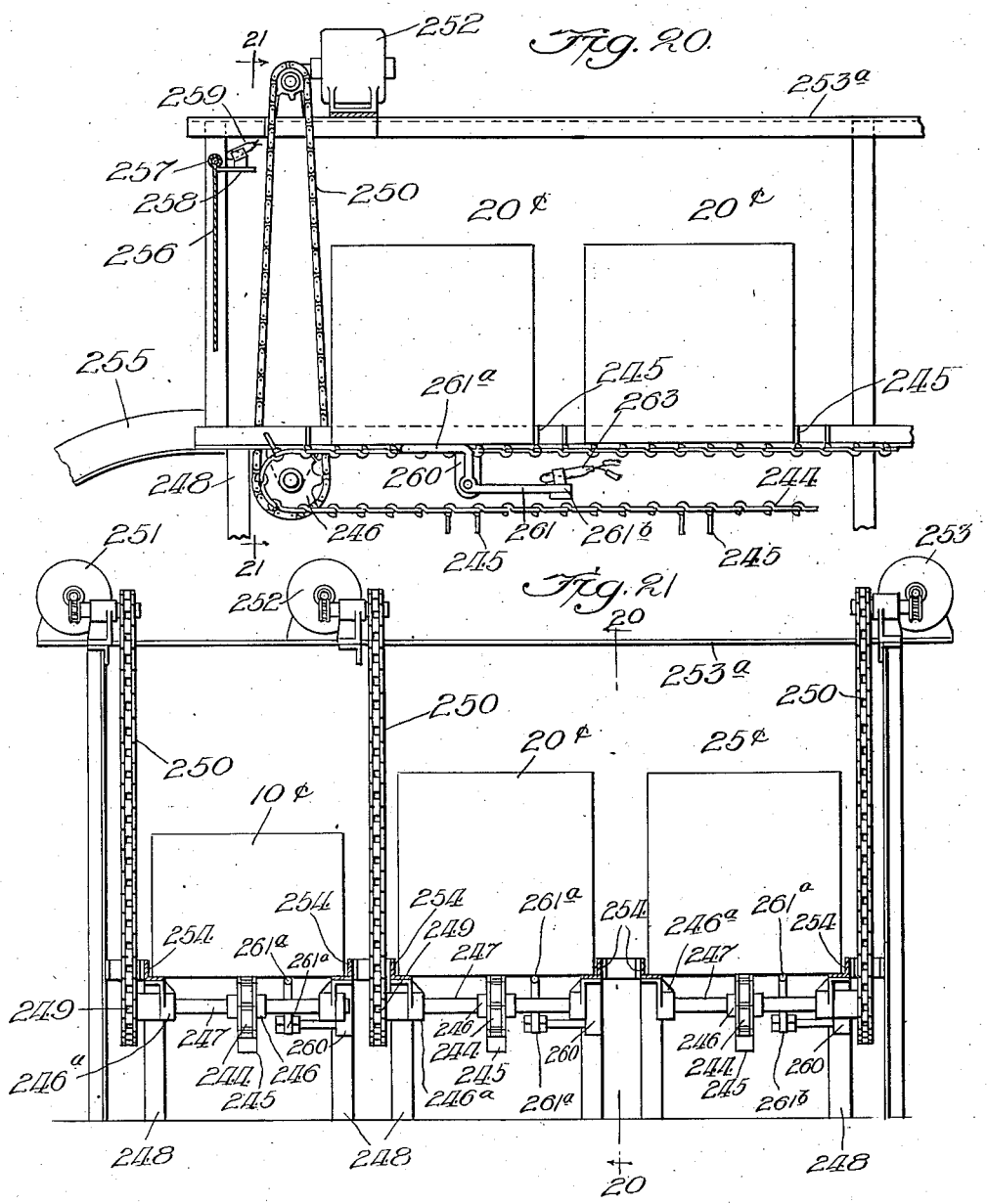

Sept. 21, 1943.    J. JETSECK ET AL    2,330,186
VENDING MACHINE
Filed June 9, 1941    9 Sheets-Sheet 8
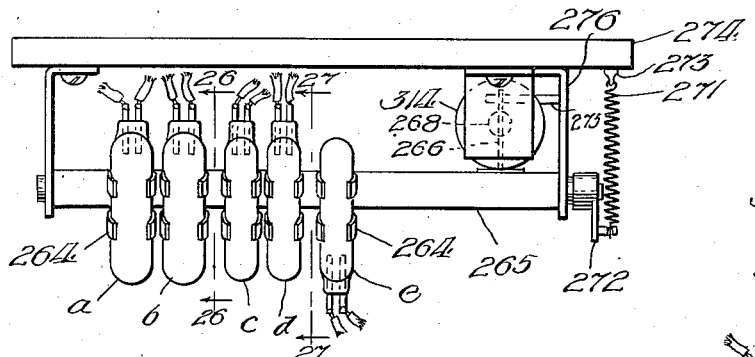
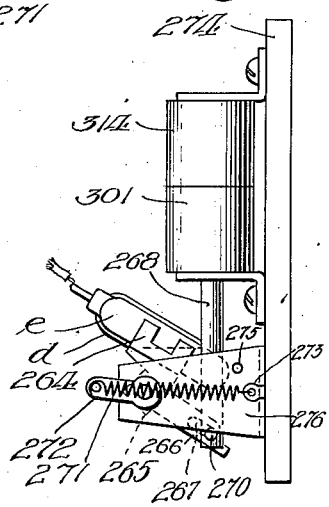
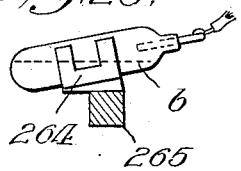
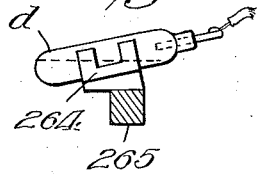
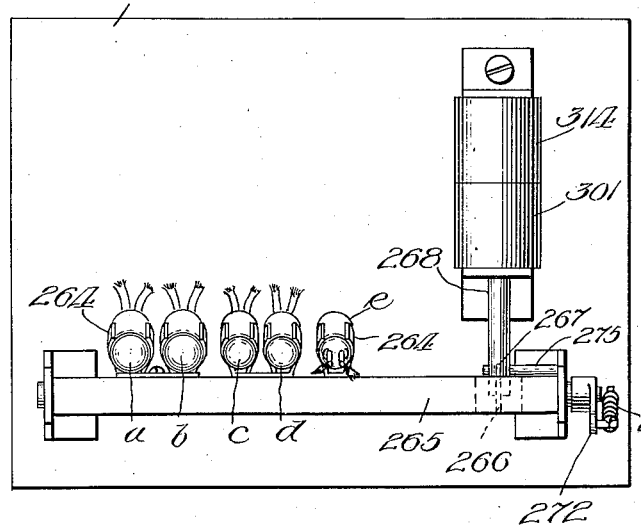
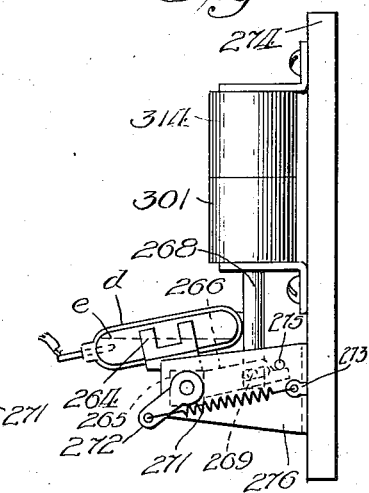
Inventors;
Joseph Jetseck and
Fred N. Jach
by Edward N. Weisert
Atty

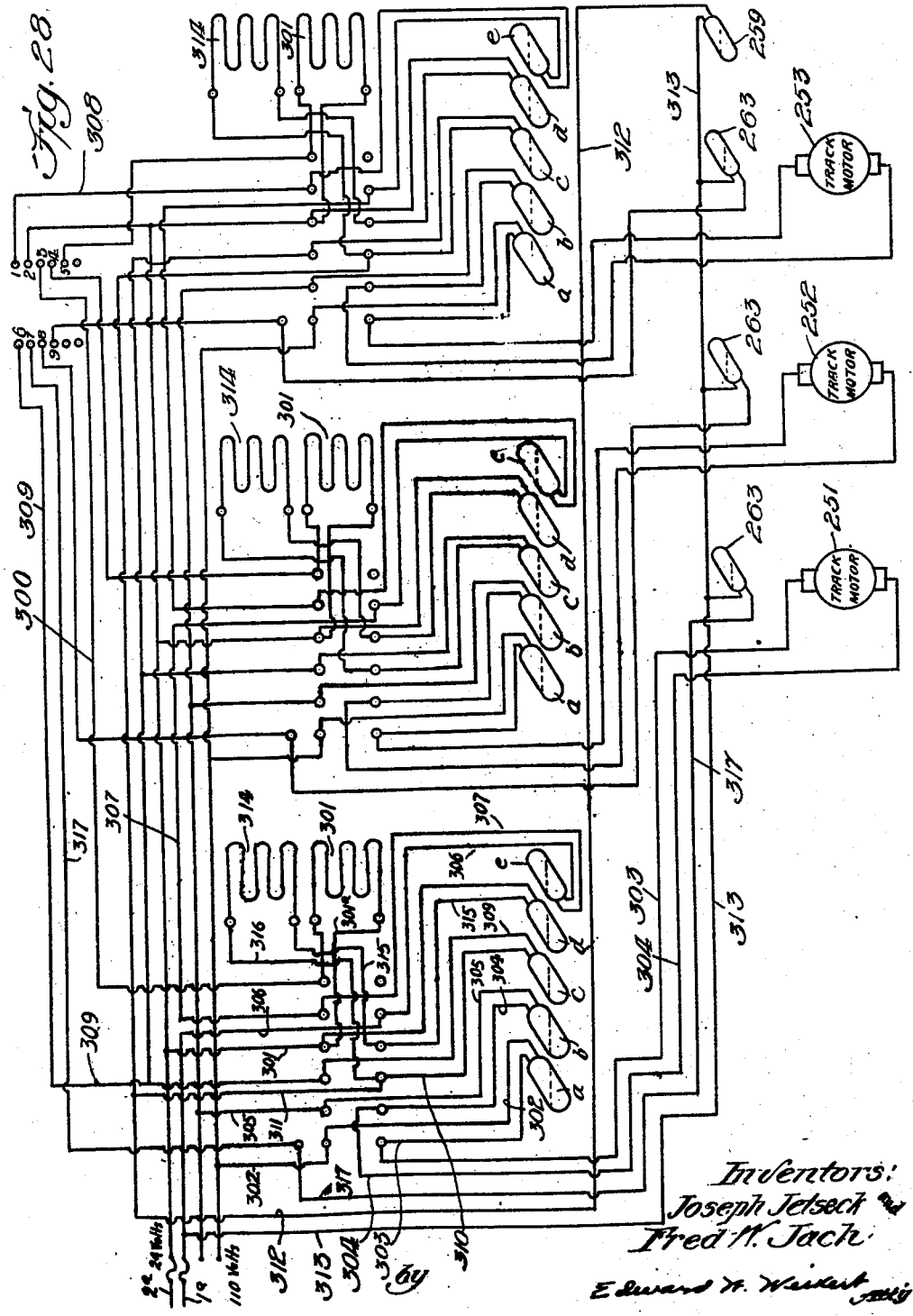

UNITED STATES PATENT OFFICE 2,330,186

VENDING MACHINE

Joseph Jetseck and Fred W. Jach, Chicago, Ill., assignors to Lincoln Boyle Ice Company, Chicago, Ill., a corporation of Delaware Application June 9, 1941, Serial No. 397,226

30 Claims. (Cl. 194—10)

This invention relates to a vending machine for vending ice or other commodities that may be kept in an ice box or store room or the like and conveyed therefrom and concerns itself primarily with coin controlled means for delivering differently priced pieces of ice or commodities under predetermined conditions.

One of the objects of the invention consists in the provision of coin controlled mechanism in which one or more coins can be used to obtain the same article. For example, instead of a dime, two nickels may be used, or instead of a quarter five nickels may be used.

It is a further object of this invention to provide coin controlled vending mechanism which will make proper delivery only in the event that the correct coin or the correct amount of coins has been inserted and that will return an incorrect coin or an incorrect group of coins to the intended purchaser without any delivery of substance.

It is a still further object of this invention to provide means whereby the coins inserted for a desired article will be returned if such desired article is not present or has been sold out, or if the machine is vending.

It is also an object of this invention to provide means for returning all inserted coins if the electric supply used should be off.

It is a further object of this invention to provide a coin catcher in such an apparatus that will discharge the coins through different controlled outlets in accordance with the set up of electrical circuits to cause delivery or not to cause delivery of ice or substance.

In accordance with this invention there is provided a coin controlled set-up mechanism or accumulator that is stepped up one step for each coin unit preferably a nickel until it registers the price of a desired article. When the accumulator is thuswise set up under proper vending conditions, the closing of a switch will put the delivery motor for delivery the desired article into circuit with the set up accumulator and after delivery of the article, the mechanism will be automatically reset and the coins discharged into the coin receptacle.

It is characteristic of this invention that substantially all operations are electrically and automatically controlled through a circuit that is normally alive in the vending machine.

Other objects, advantages and novel features of the invention will become apparent as the description proceeds.

The invention comprises the novel structure, circuits and combination of parts hereinafter described and more particularly pointed out and defined in the appended claims.

In the accompanying drawings which illustrate a preferred form of this invention and in which similar reference characters refer to similar features in the different views:

Fig. 1 is a front elevational view of the coin box involving this invention;

Fig. 2 is a side elevational view of the coin chute showing certain control mechanism;

Figs. 2A and 2B are sections showing switches hidden in the main views;

Fig. 3 is a part elevational view and a part sectional view taken vertically through the coin box substantially in the plane of a coin chute;

Fig. 4 is a horizontal sectional view through the coin box taken in a plane above the coin chute and looking down;

Fig. 5 is a fragmentary sectional view taken transversely through a coin chute;

Fig. 6 is a sectional view through the lower portion of a coin chute;

Fig. 7 is a fragmentary elevational view of one end of the coin catcher illustrating the reset switch;

Fig. 8 is a top plan developed view of the motor drum;

Fig. 9 is an elevational view of the rear of the coin chute structure;

Fig. 10 is a sectional view on the line 10—10 of Fig. 3 and Fig. 11;

Fig. 11 is a sectional view on line 11—11 of Fig. 10;

Fig. 12 is a part sectional view and part elevational view taken on the line 12—12 of Fig. 3;

Fig. 13 is a sectional view taken upon the line 13—13 of Fig. 12;

Fig. 14 is a sectional view taken upon the line 14—14 of Fig. 3;

Fig. 15 is a fragmentary elevational view of Fig. 14 looking in the direction of the arrow;

Figs. 16, 17, 18 and 19 are wiring diagrams of the electric control system;

Fig. 20 is a longitudinal view through an ice delivery mechanism taken substantially upon the line 20—20 of Fig. 21; and showing the switch unit for each delivery mechanism;

Fig. 21 is a sectional view taken upon the line 21—21 of Fig. 20;

Fig. 22 is a plan view of supporting and operating means for certain control switches of the delivery mechanism;

Fig. 23 is an elevational view of the structure shown in Fig. 22;

Fig. 24 is an end elevational view showing parts in normal position;

Fig. 25 is a view similar to Fig. 24 showing parts in operative position;

Fig. 26 is a sectional view on line 26—26 of Fig. 22 showing one motor switch;

Fig. 27 is a sectional view taken on line 27—27 of Fig. 22 showing a solenoid switch; and Fig. 28 is a wiring diagram of the control circuit in the ice box.

In referring now to the drawings which illustrate a preferred form of this invention, it will be noted that the coin box consists of a metal casing 110 having a coin slot 111 for nickels, a slot 112 for dimes and a slot 113 for quarters. Below the coin slots, there is a swing rod or lever 114 for opening the coin chutes and at the bottom there is a hand hole 115 for receiving returned coins. The mechanism in the casing is primarily designed to control a plurality of ice or article vending circuits which emerge from the casing as indicated at 116 and lead to an ice box or storage room or the like as will later more fully appear. These vending circuits are established by a push button switch 43 projecting from the front of the coin box.

There are three coin chutes 117, 118 and 119 for respectively receiving the nickels, dimes and quarters (Figs. 3 and 4). The coin passages in these chutes are all similar and only one has been illustrated in Fig. 3. When a coin is inserted in a coin slot it enters a guideway 120 and descends through a zigzag coin passage 121. Such coin passages are well known and the action and course of coins therethrough is also well known and requires no description.

However, according to the present invention, a descending coin under normal conditions strikes a switch lever 122 which has an L-shaped foot 123 (Fig. 3) extending through an arcuate slot 124 in the walls of the coin chute. Near its upper end, the lever 122 is bent at right angles and extends through a U-shaped bearing 124. The right angled portion that goes through the U-shaped bearing is then bent up as indicated at 125 (Fig. 9) and is then bent back as indicated at 126. This portion 126 extends behind a leaf spring 127 (Fig. 3) for bringing the same into contact with a second leaf spring 128 for closing the coin controlled circuit. These leaf spring switch blades are connected at their lower ends to electrical conductors 128a and 129a which are part of a normally live circuit. Each coin controlled switch is housed between the rear end of a coin chute and a metal housing strip 130 attached to the rear end of the coin chute. At its lower end, each housing strip 130 confines the usual insulation strips 131 for the switch blades 127 and 128.

The different coins in descending through their respective chutes will strike their switch levers 122 and momentarily close their respective switches. It will, of course, be understood that the coins should singly be inserted in the coin box. As each coin falls away from its switch lever 122, it will descend into a coin catcher 132 (Fig. 3) which consists of two converging swinging gates 133 and 134. The gate 133 is designed to discharge the coin or coins as the case may be into a coin receptacle 135 which is in the form of a drawer removable through the rear end of the casing. The gate 134 is designed to discharge the coin or coins into a coin return chute 136 which leads to the hand hole 115 on the front end of the box. Each gate is attached at its upper edge to an oscillatable shaft 137 journalled in the side plates 138 (Fig. 9) of the chute 136 and the coin catcher 132. Each shaft 137 has a crank 139 at one end and each crank has a pin 140. The pin 140 on the crank of bar 137 supporting gate 134 extends through a slot in the core bar 141 of the coin return solenoid 61. The pin on the other crank extends through a slot in core bar 141 of a coin drop solenoid 85. The solenoid 61 is only energized when an attempt is made to obtain ice from an empty conveyor or wrong coins or wrong amounts are inserted. The solenoid 85 becomes effective at the end of a delivery operation. The two solenoids are suitably supported upon a platform 143 upon one side plate 138.

These solenoids are suitably connected in coin drop and coin return circuits through the electrical conductors 144, 145, 146 and 147, and as shown in the wiring diagrams later to be explained. Upon the end of the coin discharge chute 136 (Fig. 7) opposite the solenoids, there is suitably secured a reset switch U that consists of a blade 148 and a blade 149 suitably insulated at 150. Insulated from the blade 149, there is a spring arm 151 that extends adjacent a collar 152 fast on shaft 137 that operates the coin return gate 134. This spring 151 has its upper end 153 inclined toward the collar for engagement by a screw 154 carried by the collar. Oscillation of the shaft 137 in a clockwise direction will cause the screw 154 to strike the spring arm 151 for closing the switch U. The switch U is connected by suitable conductors 154a and 155 in a reset circuit as will later more fully appear. It might, however, be pointed out that when a coin or group of coins are returned, the switch U is always closed, but the reset circuit therethrough is only established when an attempt is made to obtain an article from an empty conveyor.

Adjacent the bottom of the coin chutes 117, 118, and 119, there is a flat reciprocable bar 156 (Figs. 6 and 9) which is slidably supported in suitable slots in the side plates 157 that house the coin chutes. This bar has three spaced studs 158 in the form of screws, each extending adjacent a coin chute. Each stud 158 is adapted for engaging a counter weight 159 on a rod 160 rotatably supported in brackets 161 on the side of the adjacent coin chute. The ends of the rod 160 are bent to provide prongs or fingers 162 and 163 adapted to alternately enter apertures 164 and slots 164a, respectively in the walls of the coin chute; the slots 164a being at the bottom (Fig. 3). One end, 165 of the bar 156 is adapted to be engaged by an armature bar 166 (Fig. 9) pivoted at 167 to a frame 168 of an electro-magnet 31 which is supported adjacent one of the side plates 157. A spring 166a attached to the upper end of the armature bar 166 and the frame of the solenoid normally urges the armature bar 166 away from the electro-magnet. The magnet is normally in the live circuit of the machine and is effective for shifting bar 156 to the right away from the counter weights 159 which will hence drop or hang down holding fingers 162 out of the coin chutes, and fingers 163 in the coin chutes. It will be noted that fingers 163 slope downwardly and enter slots 164 in the lower end of the chute in a coin path removed from the fingers 162.

When the bar 156 is in its normal position under the influence of the electro-magnet 31, the coins can follow their normal path into the coin catcher as the fingers 162 are held out of their chutes. However, if the live circuit in the machine should fail or not be on, a spring 170 connecting the bar 156 with the left hand side plate 157 will slide bar 156 to the left and causing studs 158 to engage the counter weights 159 and rotate the rods 160 for causing fingers 162 to move into their respective coin chutes in which positions the fingers 162 will deflect the coins and cause the same to drop into the coin return chute 136. In referring to Fig. 3, it will be noted that the coins may drop down on either side of the swivel block 171, when they are deflected by fingers 162 and when they drop down the right hand passage, they fall directly into the coin chute 136 and are returned to the customer. Thus, a protection is provided against a customer losing his money when the live circuit is off.

When a nickel is inserted in the nickel coin slot, it will close its switch 127—128 (Fig. 3) which is in a circuit that leads to a step up electro-magnet 40 (Fig. 11) for energizing the same, for attracting an actuating armature lever 173 which is pivoted at 174 to a metal frame 175 adjacent one end of such lever. The forward end portion of the lever 173 is adapted to engage a ratchet wheel 176 which is secured upon a shaft 177 which carries a selector or accumulator arm 42 adapted for engaging contact points 179 (Figs. 4 and 11) on a selector or accumulator plate 50 made of insulation and attached by posts 180a to a support or wall plate 184. The rear end of the actuating or step up lever 173 has attached thereto one end of a coil spring 181; the other end of which is attached to an adjustable screw 182 supported on the frame member 175. This spring normally tends to swing the lever away from the magnet. A spring 183 attached to the forward end of the step up lever 173 is anchored to the wall 184 of the metal frame and aids in lifting the step up lever from the ratchet wheel and also moves it laterally for a new grip. A spring pressed holding pawl 195 pivoted at 195a and connected at its tail by spring 195b to casing 175 normally holds the ratchet against reverse rotation.

The selector arm 42 rotates against a stationary conductor ring 185 which is insulated from the shaft 177 as indicated at 186 and which surrounds the shaft. This ring 185 is in electrical contact with a spring pressed plunger 187 which extends through the selector plate 50 from a binding post 188 to which an electrical conductor is connected as will later appear.

It might be mentioned that the distance between a pair of contact points 179 represents one step of lever 42 as effected by one impulse produced by a five cent value of coinage. In referring to Fig. 4, it will be noted that there is a zero contact point also a 5, 10, 15, 20, and 30¢ contact point adapted to be contacted by arm 42. It will further be noted that contact points 5, 16 and 30 are connected by a wire 189 which in turn is connected to a wire 52 which is in a reset circuit leading to electro-magnet 55 (Fig. 10) which attracts an armature bar 191 which is pivoted on a prong 192 on the casing 193 of the magnet 55. This bar engages a tail piece 194 rigidly secured to the spring held holding pawl 195 which engages the ratchet wheel 176. A spring 196 connects the tail end of bar 191 which, it is noted, projects beyond the prong 192 to a support 197.

A coil spring 198 (Fig. 11) surrounds the shaft 177. One end of the spring is anchored to the wall 184 as indicated at 199 while the other end is anchored to the shaft as indicated at 200. This spring will rotate the shaft to reset position.

When step up magnet 40 has actuated bar 173 one step for rotating ratchet wheel 176, shaft 177 and selector arm 42, one step, the said arm 42 will engage the 5¢ contact point. Now, if the reset circuit through wire 52 is established as will later appear, magnet 55 will be energized for attracting bar 191 for releasing holding pawl 195 and allowing shaft 177 to rotate arm 42 back to the zero point on the selector plate 50. In order to stop the resetting or reverse rotation of shaft 177, a stud 201 on ratchet wheel engages a hooked end on a stop bracket 202 attached to the wall plate 184.

Two switches A and C are controlled by the reset magnet 55. The switch A consisting of plates 203 and 204 is normally closed while the switch C consisting of plates 205 and 206 is normally open. The switch plates 203 and 205 have tail portions connected by an insulated tie 207. The outer portions of the blades are confined between insulation strips 208. From these insulation strips, the switch blades are bent or urged in a direction away from the magnet with the switch blade 203 resting upon the bar 191. As a result when bar 191 is attracted by magnet 55, switch A will be opened and switch C will be closed.

The first impulse imparted to shaft 177 will cause it to close switch B as is best shown in Fig. 4. The switch B consists of two spring blades 209 and 210 which are held in insulated relation on the frame enclosing the set up mechanism. These blades are L-shaped and the blade 209 is longer than the other for engagement by a stud 211 on the shaft 177, or a collar on such shaft. In Fig. 4, it will be noted that in zero or reset position, switch B is normally open. However, the first step up of ratchet 176 will rotate shaft 177 in a counterclockwise direction as viewed in Fig. 4, and cause the stud 211 to move away from blade 209 and allow the switch to close. It might be mentioned that switch B will remain closed until the arm 42 is reset to zero, or in other words, when shaft 177 is rotated by spring 198 during the resetting operation to initial position. It might also be mentioned that each successive nickel inserted will cause selector or accumulator arm 42 to advance another step until the limit is reached.

When a dime is inserted in the machine, mechanism will be brought into operation to impart two step ups to selector arm 42. To accomplish this, it is necessary to send two successive electrical impulses through the set up circuit to magnet 40. This is accomplished as follows:

A housing 212 (Figs. 4 and 9) is attached to one side of the coin chute housing. A shaft 213 extends through this housing and supports a motor drum 68 adjacent the inner side of the housing. Electrical spring conducting fingers 67, 92, 74 and 69 yieldingly engage the surface of the drum. The shell of the drum is made of conductive metal and the surface of the drum between the fingers 67 and 69 is covered with insulation. The fingers 67 and 69 ride over the uninsulated margins and are in circuit while the intermediate fingers 92 and 74 ride over the insulation which is, however, provided with 2 successive bald contact spots 68a (Fig. 8) which pass under finger 74 for imparting two successive impulses to finger 74, and five successive bald contact spots 68a which pass under finger 92 for imparting five successive impulses to finger 92. It might be mentioned that the five impulses arise when a quarter or its equivalent is inserted in the machine. These fingers are held in an insulated clamp 214 attached to the housing of the coin chutes.

When the drum 68 has made substantially a revolution, the finger 69 will drop into a cut out 68b and break the current through the drum. Rotation of the drum shaft closes an over ride switch I through an eccentric 215 (Figs. 2 and 4). It might be mentioned that this switch supplies current to the motor and drum for a moment to cause the drum to ride the finger 69 out of the cut away 68b at which time switch I will automatically open. The drum 68 is rotated by a small motor 72 which is supported from the housing 212. The drum shaft 213 carries a gear 217 which is connected by intermediate gearing 218 and 219 to a pinion 220 on the armature or rotor shaft 216 (Fig. 4) of the motor 72.

The circuits to the motor 72 and the drum 68 and coils and the circuits from the drum to the step up coil are controlled by certain magnetically operated blade switches which will now be described: Suitably supported upon one side of the housing of the coin chute is the 10 and 25 magnet (Fig. 2) from above which hangs a bracket 221 which supports four insulated switches E, G, and D and F, which are in back of E and G and are shown in Fig. 2A. The switches G and F are normally open while the switches D and E are normally closed. Each switch as a blade 222 extending through a slot in a plate 223 which is attached to a flat bar 224 at substantially right angles thereto and which extend adjacent the pole of the electromagnet 10 and 25. This bar 224 is fulcrumed upon a curved support 225 supported by bracket 221. A spring 226 attached to the free end of the flat bar 224 is anchored to a support 227 thereabove. This spring normally urges the plate for closing switches E and D and opening switches F and G. It will be noted that switches D and F have a common blade 222 which is shifted for closing one switch and opening the other. When the electromagnet is energized, the bar 224 will be attracted for shifting plate 222 for opening switches D and E and closing switches F and G, which control the current to the motor and motor drum.

Supported upon the frame 212, is the 25¢ electromagnet which controls three switches designated H, N and O. The switch N is behind the switches H and O, and is shown in Fig. 2B. The spring blades that form these switches are supported in insulated position by a bracket 228 suspended from the 25 magnet. Each switch has an extended blade 229 which extends through slots in a shift plate 230 attached to a flat armature bar 231 fulcrumed upon a support 232 sustained by bracket 228. A spring 233 anchored to the free end of the bar 231 and to a support 234 tends to urge the bar for closing switch H. It will be noted that switches N and O have a common blade 229 that closes one switch and opens the other. The switch H is normally closed while the switches N and O are normally open. However, when the 25 magnet is energized and bar 231 is attached, switch H will be opened and switches N and O will be closed. Switches H and O control the current from the motor drum to the resetting mechanism while switch N feeds current through magnet 25 to keep it alive under certain circumstances.

In Figs. 12 and 13 are shown three sets of switches for shutting off the current from the delivery circuits and establishing circuits through the coin return solenoid. The switches J, M and P are normally closed while the switches Q, S, and T are normally open.

In referring to Fig. 13, there is shown a sectional view which illustrates the construction of the double switches P and T, M and S, and J and Q, which are alike. Each double switch has a central blade 235 which extends through a slot in a shift bar 236 which is carried by a bracket 237 fulcrumed upon a fulcrum member 238 adjacent the front face of the 25¢ electro-magnet. A coil spring 239 attached to the bar 237 and a stud 240 supported by the frame of the electromagnet serves to normally shift plates 236 and 237 for closing switch P. When the electromagnet is energized through the closing of a switch at the delivery conveyor when such conveyor is empty, the plate 237 will be attracted for opening switch P and closing switch T. It might be mentioned that any of the switches Q, S or T is adapted to establish a circuit with the coin return circuit through switch U for returning coins put in the machine for a product sold out or missing.

The fourth set of switches K and L shown in Fig. 12 are normally open and are adapted to be closed by a relay reset R which is adapted to be energized after each delivery of an article for closing switches K and L, one for establishing a circuit to the reset magnet 55 and the other for establishing a circuit to the coin drop solenoid 85. These switches are opened and closed by a shift plate 241 (Fig. 3) attached to an armature bar 242 in a manner similar to the other switches.

In Figs. 14 and 15 are shown the circuits connecting posts or sockets in the coin box from certain ones of which the circuits are led to points beyond the coin box and in or adjacent an ice-house or storage place where the delivery conveyors are located. As such circuit posts are old, they need not be described. These circuits are described in connection with the wiring diagrams shown in Figs. 16 to 19 to which reference will now be made.

In order that the wiring diagram may be clearly understood, it is shown in four sections or figures. The wires of one section may be provided with plugs to fit into sockets in the other section. Thus the numerals 17, 18, 19 and 20 in Fig. 16 may represent posts or plugs that fit respectively in sockets 17, 18, 19 and 20 in Fig. 17. Likewise, the numerals 21, 22, 23, 24, 25, and 26 in Fig. 19 may represent posts or plugs fitting in sockets 21, 22, 23, 24, 25, and 26 shown in Fig. 17. Likewise, the two rows of posts or plugs 1 to 8 and 9 to 14 in Fig. 18 are adapted to fit the correspondingly designated sockets shown in Fig. 17. Of course, the plugs and sockets on the different parts may be reversed, as it is immaterial which part has the plug and which part contains the socket.

In reading the diagram, the four sections will be considered as connected together as above explained. Thus to follow a circuit from point 17 in Fig. 16, it is necessary to go to Fig. 17 and trace the current from 17 in Fig. 17. It will be found that point 17 connects with point 10 and that point 10 goes to electro-magnet 40 in Fig. 18.

The operation of the electrical circuits can best be described from the wiring diagrams, Figs. 16 to 18 and in referring to these figures, it will be observed that there is normally a live circuit in the coin box. The posts 1 and 2 constitute the terminal posts for the incoming and outgoing current from a city main, the voltage of which may be reduced by a transformer (not shown). The current entering at post 1 will flow through wire 27 to post 18 and from post 18 (Fig. 16) through wire 29, normally closed switch D, wire 30, magnetic rejector 31 and wire 32 to post 20, which is connected by wires 33 and 34 (Fig. 17) with post 2 the opposite side of the power. This might be termed a normally permanent circuit that supplies the motive power for different control parts in the box.

The apparatus is so designed that no purchase can be made with an improper number of coins. Delivery of ice or articles can only be effected by the insertion of two nickles, four nickles or five nickles, or one dime, two dimes, or two dimes and a nickel or a quarter. If other amounts or variations in numbers are inserted, they will be returned as will now be described.

*Coin return*

Assume that a single nickel is inserted in the nickel chute and momentarily closes the switch 35 (Fig. 16) the current will flow through wire 28, switch 35, wires 36 and 37, to post 17. From post 17, the current will flow through wire 38 (Fig. 17) to post 10 and from post 10 through wire 39 (Fig. 18) to and through magnetic set up coil 40 and hence through wire 41 to post 2 which is the opposite side of power. As the current passes through coil 40, the accumulator or selector arm 42 will be moved one step from zero to point 5 and switch B will be closed. If push button switch 43 is now pushed into operative position for closing the circuit between posts 23 and 26, the following result will be obtained. The current from post 1 will flow through wires 27, 28, switch D and wire 30 to post 19 (Figs. 16 and 17). From post 19, the current will flow through wire 44 to post 23 and from post 23 through wire 45, switch 43 and wire 46 to post 26 (Fig. 19). This post 26 is connected by wire 47 with post 13 (Figs. 17 and 18). From post 13, the current flows through wire 48 and normally closed switch A and then through wire 49 to center 50a of accumulator or selector plate 50 which consists of insulating material. From center 50a the current will flow through step up arm 42 to No. 5 contact point which is connected by wire 51, with wire 52 which leads to post 14 (Fig. 18).

From post 14, the current flows through wire 53, and switch B which was closed by the first step up of arm 42 and then through wire 54 and magnetic reset coil 55 to wire 41 and post 2, the opposite side of power. Passage of current through magnetic reset coil 55 will reset selector or accumulator arm 42 to zero and close switch C and open switches A and B. Current may now pass from post 1 through wire 56, switch C, wires 57 and 53, switch B, which has an opening lag behind the closing of switch C, wire, 54, and magnetic reset coil 55 to wire 41 and post 2. Thus the magnetic coil 55 is again energized to effect complete resetting in the event that this was not fully accomplished in the first instance. When coil 55 becomes dead through opening of switch B, switch A will be closed and switch C opened.

The push button switch 43 is still being held in place while the selector arm 42 has dropped back to zero. With the accumulator or selector arm at the zero point, and switch A closed, current entering the center 50a of the accumulator plate 50 will flow through arm 42 to zero point and then through wire 58 to post 11 (Fig. 17). From post 11, the current will flow through wire 59 (Fig. 17) to post 24 (Figs. 17 and 19) and from post 24, the current will flow through wire 60, solenoid return coil 61 and wire 62 to post 21 which is connected to post 2 (Fig. 17), the opposite side of power. The passage of curent through coil 61 will cause the operation of the return side of the coin catcher for returning the coin to the accessible hand hole. The push button switch may now be withdrawn.

If the improper number of three nickels were inserted in the machine, there would be three successive impulses imparted to the accumulator arm 42 that would step the same up to the 15¢ point. That is each nickel would cause one impulse to arm 42 in a manner above described. Then if push button switch 43 were inserted, the same operation would occur just as if a single nickel had been inserted except that the current from the center of the accumulator would now flow to 15¢ point and then to wire 52 because arm 42 has been stepped up to point 15 which is connected to wire 52 and the three nickels would be returned as explained for a single nickel.

If more than 25¢ were inserted in the machine, say 30¢, there would be six successive impulses imparted to accumulator arm 42 that would cause the same to rise to its limit at the 30¢ mark. Then if push button switch 43 were manually closed the thirty cents would be returned as in the case of the single nickel. In this case, however, the current from the center of the accumulator would be conducted to the 30¢ point which is in circuit with magnetic reset wire 52 and resetting and return of the coins would be effected in a manner already explained.

It might be mentioned that if instead of three nickels, a dime and a nickel were inserted, the accumulator arm would be given three impulses as will later appear to bring the same to the 15¢ point and the three nickel operation as above described, would be repeated for returning the coins.

It will be noted that the 5¢, 15¢ and 30¢ contact points on the accumulator or selector are all connected with the reset wire 52 and have no connection with the motor control wires and as a result the insertion of improper coinage will produce no delivery of ice or merchandise but will cause a return of such coinage.

*Operation when proper coins are inserted*

To secure a 10¢ purchase, two nickels may be inserted or a dime may be inserted in the machine. The dime will produce two impulses on the accumulator arm in a manner that will later appear.

We have already described how the insertion of a nickel in the nickel slot will cause accumulator arm 42 to rise one step. Now the insertion of a second nickel will simply repeat the operation of the first nickel and cause the accumulator arm 42 to make a second step which will bring the same to the 10¢ contact point.

If, on the other hand, a dime were inserted in the ten cent slot instead of two nickels, the mechanism would be brought into operation that would produce two successive steps to accumulator arm 42 which would cause the same to be stepped up to the 10¢ contact point just as in the case of two nickels. Just how this is accomplished will now be set forth.

If a dime is inserted in the ten cent slot to close the switch 63, the current will from post 18 through wire 28, coin switch 63, wire 64, relay coils 10 and 25 to wires 65—32, post 20 and wire 34 to post 2, the opposite side of power. As the current passes through relay 10 and 25, the switches D and E will be opened while the switches F and G will be closed. The current will now flow from post 18 through wire 28 and through switch F to wire 66 which leads to finger 67 on motor drum 68. From finger 67 on motor drum, the current will pass through the shell of the drum to finger 69. It will be remembered that fingers 67 and 69 are normally in electrical contact with the metal shell of the drum which serves as a conductor between the two remote fingers 67 and 69. The current emerging from finger 69 will flow through wire 70 and through switch G which is now closed and then through wire 71 to motor 72. From motor 72, the current flows through wire 73 to wire 65—32 and post 20 and back through wires 33 and 34 (Fig. 17) to post 2. Incidentally, the current passing through wire 70 will split with a part going through relay 10 and 25 to wire 65 in order to keep the relay 10 and 25 alive to maintain switches F and G in closed position for two impulses.

With the motor 72 energized and running by the current now passing therethrough, rotation will be imparted to drum 68. The drum has two successive bald contact spots 68a under the intermediate finger 74 and part of the current passing through the drum will emerge through finger 74, wire 75, and closed switch H to wire 76—37 which go to post 17 which is connected by wire 38 with post 10. From post 10, the current passes through wire 39, step up coil 40 and wire 41 back to post 2, the opposite side of power. As coil 40 is energized, it will cause accumulator arm to be stepped up one step and cause switch B to be closed. Further rotation of drum 68 will cause the next bald contact 68a in line to pass under finger 74 and impart a second impulse through the just mentioned circuit for imparting a second step up to accumulator arm 42 to bring the same to the 10¢ contact point just as was accomplished by two nickels. After delivering these impulses, the drum will rotate the cut out 68b under finger 69 and break the drum, motor and relay circuit, and reverse switches E, D, F and G. Switch I is an over ride switch that is closed by the rotation of the drum and kept closed until the cut out 68b rotates beyond the finger 69 substantially into the position shown in Fig. 16. The breaking of the circuit through the drum would immediately cut out the motor if it were not for switch I which provides the current to the motor until the drum overrides the finger 69 or causes it to ride out of the cut out, at which time the switch I opens and the motor and drum stop.

Thus, it will be evident that the accumulator can be set for delivery of a 10¢ article either by the insertion of two nickels or a dime and it makes no difference with respect to subsequent operations which coins were used as long as the accumulator arm 42 is moved into contact with the 10¢ contact.

With the accumulator arm 42 stepped up to the 10¢ contact on the plate 50, delivery of a 10¢ commodity or piece of ice can be effected by pressing in the push button 43 to indirectly put the 10¢ delivery motor or apparatus in operation. With the push button switch 43 closed under such conditions the current will flow from post 1 to post 18 and hence through wire 28 and switch D which is now closed to wire 30. Wire 30 will carry the current to post 19 from which it will pass through wire 44 to post 23. From post 23 the current will pass through wire 45, switch 43 and wire 46 to post 26 which is connected by wire 47 with post 13. From post 13, the current passes through wire 48, normally closed switch A and wire 49 to center 50a of accumulator. The current is then conducted from such center through the accumulator arm 42 to contact point 10, and from 10¢ contact point, the current will flow through wire 77 and closed switch J, wire 78 to post 3 which connects with the control box of the 10¢ article delivery motor beyond the coin box.

The delivery of the desired article will effect the closing of a mercury switch that will put post 6 and wires 79 and 80 in circuit. It will be noted that wire 80 leads to reset coil R which closes switches K and L, part of the current passing on through wire 41 to post 2, the opposite side of power and part passing through wire 81 and switch L and switch B, and resetting coil 55 and wire 41 to post 2. This energization of the resetting coil 55 will reset the accumulator arm 42 to zero and close switch C and open switches A and B. Current from 1 will then pass through switches C and B and coil 55 to assure complete resetting.

Part of the current passing through wire 81 will go through switch K and hence through wire 82 to post 12 (Fig. 17). From post 12, the current passes through wire 83 (Fig. 17) to post 22 and post 22 is connected by wire 84 with the solenoid 85 (Fig. 19) which operates to discharge the coin or coins into the coin drawer. The current then returns through wire 62 to post 21 which connects with post 2, the opposite side of power. Thus, it will be apparent that the machine is cleared and reset at the end of each vending operation and ready for a new customer.

To obtain a 20¢ purchase of ice or commodity, four nickels may successively be inserted in the five cent slot or two dimes may successively be inserted in the ten cent slot. Either of these groups of nickels or dimes will cause the accumulator arm 42 to be stepped up to the 20¢ contact point. The manner in which a plurality of nickels will step up the accumulator has already been described. It has also been pointed out how a single dime produces two successive step ups on the accumulator arm 42. The insertion of a second dime will merely repeat the operation of the first dime and impart two further successive step ups to the accumulator arm to eventually bring it to the 20¢ point.

With the accumulator arm set at the 20¢ point, the machine is in position for the closing of the push button switch 43. If the push button switch is now closed, a circuit to the center 50a of the accumulator plate 50 will be established in a manner already explained and requires no further explanation. With the circuit established to the center of the accumulator, the current will flow through arm 42 to 20¢ contact point to which wire 86 is connected. The current will flow through wire 86 and normally closed switch M to wire 87 which leads to post 4 which in turn is connected by a wire 88 controlling the operation of the 20¢ delivery motor.

At about the end of the delivery of a 20¢ purchase, the circuit through wire 79, post 6 and wire 80 will again be established as previously explained to close switches K and L and reset the accumulator arm to zero and open switch B and to also cause the operation of the solenoid coin return for dropping the coins from the coin catcher to the regular coin box as already explained. At this point, the apparatus is in condition for further purchases.

To secure a 25¢ purchase, five nickels or two dimes and a nickel or a quarter may be used. The successive insertion of five nickels will step up the accumulator arm 42 to the 25¢ contact point in a manner already explained. The successive insertion of two dimes and a nickel will also step up accumulator arm 42 five steps to the 25¢ contact point in a manner already explained in connection with the use of nickels and dimes that should now be understood. So the use or insertion of a quarter only needs to be described in connection with a 25¢ purchase.

Now the insertion of a quarter in the coin box will close the switch as represented in Fig. 16, by the reference 89. This will complete the circuit through wire 28 and wire 90 causing the current to pass through relay 25 to wire 65 to post 20 and hence through wires 33 and 34 and post 2 to opposite side of power. As current passes through relay 25, the switch H will be opened and the switches N and O will be closed, inducing current to pass through wire 91 and switch N to wire 70 to which switch N is connected. The current passing through wire 70 will go through relay 10 and 25 and emerge through wire 65.

As the current passes through relay 10 and 25, it will open normally closed switches D and E and close switches F and G. The current will now pass through wire 28, switch F and wire 66 to drum finger 67 and then through drum shell to remote finger 69 which connects with wire 70 which leads to relay 10 and 25 to keep it alive and also to switch G from which the current passes through wire 71 to motor 72 and out through wire 73 to return wire 65 which is connected to the opposite side of power as already set forth. Part of the current from finger 69 will also pass through wire 91, switch N and relay 25, to keep switch O closed.

As the motor 72 is now energized by the current, it will operate to rotate drum 68 for causing five successive impulses of current through finger 92 on account of the five contact spaces, and wire 93 which leads to switch O. From switch O the current passes through wire 76 and wire 37 to post 17 which is connected by wire 38 with post 10. From post 10, the current passes through wire 39 and set up coil 40 to return wire 41. The set up coil 40 will be energized and will impart one step to the accumulator arm 42. The further rotation of the drum will impart through the spaced bald spots 68a under finger 92 five successive impulses of current through the circuit 92, 93, 37, 38 and 39 to set up coil 40 which causes accumulator arm 42 to be stepped up five times into contact with the 25¢ contact. Thereafter, the motor, drum and relays 25, 10 and 25 will be cut out as previously explained when the finger 69 drops into the cut out 68b. Of course, the override switch I always comes into play to cause the drum to rotate the finger 69 in overriding position.

With the accumulator which serves also as a selector for the delivery circuit now set for a 25¢ purchase, the push button 43 should be pressed in to complete the article delivery circuit. The closing of the push button switch 43 will bring current to the center 50a of the accumulator as previously explained. From the center of the accumulator, the current will be conducted through accumulator arm 42 to 25¢ contact point to which wire 94 is connected. Wire 94 leads to normally closed switch P from which the current is conveyed through wire 95 which in turn leads to post 5 which is connected by wire 95 (Fig. 17) with the control for the 25¢ article delivery motor. After the delivery of the 25¢ article, the apparatus is reset through the completion of the resetting circuit passing from post 6 as previously explained and the coin is caused to be discharged into the regular coin receiving receptacle or drawer.

While the present machine is designed for vending three differently priced articles, it is contemplated that the number may be increased. For this purpose, there are shown on the diagram vacant posts 97 and 98, 99, 15 and 16 for additional circuits which may be added.

The apparatus has provision for cutting out each motor delivery circuit with respect to the accumulator or selector when there is no ice or commodity on the delivery conveyor operated by such motor. To this end, there is shown a 10, 20 and 25¢ coil for respectively opening switches J, M and P, which control the motor control circuits. The circuits controlling these 10, 20 and 25¢ coils will now be described.

The 10 or 10¢ coil is connected to a wire 100 which leads to post 7. From post 7 there extends a wire 101 (Fig. 17) that leads to a switch 263 that is normally kept open by the 10¢ commodity but that automatically closes when there is no commodity on the delivery conveyor. This closing of the switch will send current through wires 101 and 100 to energize the 10¢ coil for opening switch J and closing switch Q; the current passing through the 10¢ coil returning through wire 41 to post 2 the opposite end of power.

Now with switch J open, the 10¢ delivery circuit and motor are cut out with respect to the accumulator. Consequently, current from the 10¢ contact point on the accumulator will now pass through switch Q and then to wire 102 which is connected to such switch. The wire 102 leads to wire 58 and post 11 which leads to post 24 and the solenoid return circuit already described.

As a result, if 10¢ is now inserted in the coin box when there is no ice or commodity on the 10¢ delivery conveyor, the accumulator will be stepped up to the 10¢ contact which is now cut out from the ten cent delivery circuit and is in circuit with the coin return circuit through switch Q. Consequently, closing of the push button switch 43 will cause the return of the 10¢. For when the push button switch is closed the current that is led to the center of the accumulator as previously set forth will go to contact point 10 then through wire 71, switch Q, wires 102 and 58 to post 11, from post 11 through wire 59 to post 24 and then through wires 60 and coil 61, return wire 62 to post 21 and then through wire 34, to post 2. Energization of coil 61 will operate coin return gate 134 and close switch U. When switch U is closed, an accumulator reset circuit is established through wire 60, switch U, wire 108, post 25, wire 109, post 14, wire 53, switch B, wire 54, reset coil 55 to wire 41 and post 2. Energization of coil 55 will reset accumulator to zero and open switch B.

The 20¢ articles on the 20¢ delivery conveyor likewise control a switch 263 that in its closed position will put wire 103, post 8 and wire 104 in circuit with the 20¢ coil for opening switch M and closing adjacent switch S, the current from coil 20 passing through wire 41 to post 2.

The 25¢ articles on the 25¢ delivery conveyor also control a switch 263 that in its closed position puts wire 105, post 9 and wire 106 in circuit with the 25¢ coil for opening switch P and closing adjacent switch T. The current from the 25¢ coil passes through wire 41 to return post 2.

Thus, it will be evident that the absence of a commodity on any of the delivery conveyors will result in cutting out the motor circuit thereof from the accumulator and putting the coin return circuit in circuit with the accumulator so that the closing of the push button switch will merely cause the inserted coins to be returned to the would-be purchaser and the machine to be reset through switch U and connection therefrom to coil 55.

All of the switches Q, S and T are connected with wire 102 that leads to wire 58 and post 11 which is in the coin return circuit as has been previously set forth. Switches Q, S and T are also respectively connected with the 10¢, 20¢ and 25¢ contact points on the accumulator through the respective wires 77, 86, and 94. So closing of the push button switch with any or all of the switches Q, S and T closed and the switches J, M and P open will merely complete the coin return circuit for returning the coin or coins and reset the accumulator.

In the present instance, the machine is designed for vending blocks of ice and in referring to Figs. 20 and 21, it will be noted that three delivery mechanisms are shown, each comprising an endless conveyor 244 having upstanding studs 245 for engaging behind and propelling the blocks of ice or whatever commodity is handled. Each delivery conveyor 244 is in the form of an endless chain that travels around a head sprocket 246 and a tail sprocket (not shown). Each sprocket 246 is mounted upon a separate shaft 247. Each shaft 247 is suitably journalled in suitable bearings 246a upon short posts 248. Each shaft 247 carries a sprocket wheel 249 at one end over which are trained endless sprocket chains 250. These sprocket chains are respectively geared in any approved manner to motors 251, 252 and 253 supported upon a longitudinal top frame member 253a of the commodity holding compartment. The motor 251 drives the conveyor for the 10¢ piece of ice. The motor 252 drives the conveyor for the 20¢ piece of ice while the motor 253 drives the conveyor for the 25¢ piece of ice.

The cakes of ice are supported at their lateral edges upon tracks 254 which are in the form of angle bars, with the lower lateral corners of the ice fitting in the angles of the bars. It will be noted that the conveyor chains are centrally arranged of the ice blocks and are adapted to slide them along upon the tracks.

At the forward end of each track there is a chute 255 to which the blocks of ice are conveyed for descent by gravity to the purchaser. As each block of ice passes from its tracks, it swings a door or panel 256 hinged upon a rod 257, between the front frame members. Upon each door there is a support 258 for sustaining a mercury switch 259. Only one of these panel doors is shown, but it will be understood that they are all similar and similarly located. This mercury switch is in circuit with the reset circuit passing through post 6 for resetting the selector after each vending operation.

There is a bracket 260 beneath each track near the forward end thereof. An L-shaped lever 261 is pivoted upon each bracket. One arm 261a of this lever is adapted to engage under the forward block of ice; the other arm 261b supports a mercury switch 263 (Fig. 20). These mercury switches are respectively in circuit with the 10¢, 20¢ and 25¢ electromagnets. When there is no ice or commodity on a track the switch lever 261 thereunder will tip and close the switch to energize the electromagnet with which the switch is connected. For example, the mercury switch under the 10¢ commodity will cause energization of the 10¢ electromagnet for disconnecting the delivery circuit and establishing the resetting circuit through switch U.

It will be understood that the vending machine consists of a plurality, three in the present instance, of vending units. Thus the mechanism for delivering the 10¢ commodity may be termed a unit. Likewise, the different mechanisms for delivering the 20¢ or 25¢ commodities constitute similar units. Each such vending unit is controlled by a set of mercury switches shown in Figs. 22 to 27. Only one set of switches for a single unit is shown as the other two sets are identical. These mercury switches which are designated a, b, c, d, and e are respectively mounted in suitable clamps 264 which are rigidly secured to an oscillatable shaft or support 265. An arm 266 extends from the shaft 265 as shown in Figs. 24 and 25. This arm extends into a slot 267 in the lower end of a solenoid core rod 268. This end of the arm 266 is provided with a slot 269 through which a pin 270 passes for loosely coupling the rod to the arm and shaft 265. A coil spring 261 attached to an arm 272 on the shaft 265 and to an anchor 273 on the switch board 274 tends to hold the shaft in adjusted position. A stop pin 275 extending from a bracket 276 on the switch board limits the upward movement of arm 266 as shown in Fig. 24.

The solenoid rod 268 extends through a starting coil 301 which when energized operates to rotate shaft 265 to the position shown in Fig. 25 for closing switches a, b, c, and d, and opening switch e. When switch d is closed, a current is established through the stop coil for drawing rod 268 upwardly and returning switches a, b, c, d, and e to their original positions, as shown in Fig. 24.

The circuit for controlling these mercury switches and the starting and stop coils are shown and explained in connection with the ten cent circuit in the wiring diagram, Fig. 28 to which reference will now be had.

In referring to the wiring diagram in Fig. 28 which shows the circuits for controlling the three delivery units, it will be assumed that 10 cents has been deposited in the coin box and the push button switch 43 has been closed. Under such conditions, current flows from the 24 volt wire 1a through the coin box and out to point #3 (Fig. 28). From point or post #3, the current flows through wire 300 to starting coil 301 in ten cent control box and out through wire 301a to wire 2a. The energization of the starting coil 301 will operate through shaft 265 to close switches a, b, c, and d and opening switch e.

The closing of switches a and b, will complete the circuit through the 10¢ article delivery motor 251 as follows: Current now will flow from the 110 volt wire through wire 302 to switch a, and from switch a, through wire 303 to 10¢ track motor 251. From motor 251, the current returns through wire 304 and through switch b, and from switch b through wire 305 to opposite side of power of 110 volt circuit.

While switches a, b, c, and d are closed, switch e is open which shuts off the electric power to the coin box so that all coins inserted in the coin box during the delivery of ice will be rejected. The circuit through switch e leads from 24 volt wire 1a through wire 306 to switch e and from switch e through wire 307 to switch e of the 20¢ and 25¢ units. From this switch e in the 25¢ unit, the wire 308 leads to post 1 which connects with the live circuit in the coin box. Consequently when this circuit is open, as just described, the current in the coin box is shut off and all coins inserted will be rejected.

When switch c is closed a circuit between the gate switch 259 (Fig. 20) and the coin box reset relay R is established. For this switch c is connected by wire 309 with post 6 which connects with reset relay R in the coin box as previously set forth. The return from the switch c flows through wire 310 to wire 311 and hence to wire 312 to the gate switch 259. This gate switch 259 is connected by wire 313 with 24 volt wire 1a. Thus, the closing of switch c will establish the current through the gate switch and limit the flow of current to the coin box to one impulse irrespective of any swinging movement of gate 256.

When switch d is closed, a circuit is established between the gate switch and the stop coil 314 in 10¢ control box. A wire 315 leads from the switch d to stop coil 314 and a second wire 316 from the stop coil 314 leads to wire 311 and 312 to gate switch and return through wire 313. The energization of the stop coil 314 will draw the solenoid bar 268 (Fig. 24) upwardly for opening switches a, b, c, and d and closing switch e.

It might be mentioned that when ice falls from the ice track onto the chute, it closes the gate switch 259 which completes a circuit; first, through mercury switch c to the reset relay 55 which causes the selector or accumulator to be reset and causes the coins to be dropped into the coin drawer; second, the mercury switch d to the stop coil 314 which acts to reset all mercury switches to their original position. In case the 10¢ ice track is empty, switch 263 will be closed and a current will be established through wire 317 to post 7 which leads to the 10¢ relay (Fig. 18) which, when energized will cut off the flow of current to the ten cent control box (Fig. 28) and establish a circuit through switch U and coin return solenoid for returning the coin.

The operation of the 20¢ delivery unit and the 25¢ delivery unit operate in the same manner as the 10¢ delivery circuit and need no description. Each has a similar set of switches a, b, c, d, and e that are set by the starting coil 301 thereof and reset to original position by the stop coil 314.

While the operation of the machine should be understood from the foregoing, a brief summary might be added. When it is desired to obtain either a 10¢, 20¢ or 25¢ piece of ice or other commodity that the machine might be vending, proper coins are inserted in the machine to set up the accumulator to either the 10¢, 20¢ or 25¢ marks. Assume ten cents has been inserted and the accumulator has been set up. At this point, the push button switch 43 may be pushed in to establish a control circuit to the ten cent control box which is outside the coin box and shown in Fig. 28. At this time, the starting coil 301 will be energized for operating shaft 265 and closing switches a, b, c, d, and 4, and opening switch e. Switches a and b control both sides of the motor circuit. When they are both closed, a circuit is established through motor 251 for operating the 10¢ conveyor for delivering a piece of ice. When the ice falls down the chute the door 256 will be swung for closing mercury switch 259 which will establish a circuit through resetting coil 55 to reset the accumulator to zero and establish a current to the stop coil to return switches a, b, c, d, and e to the normal inactive position and the machine will be ready for another operation.

As switch e is open during the vending operation all current to the coin box is shut off with the result that the magnetic reject 31 will be dead, and the flat control bar 156 will be operated by its spring to cause all coins inserted during a vending operation to be returned.

If 20¢ or 25¢ were inserted, a similar operation would occur except that a different vending unit would be set in operation.

Now if coins are inserted in the machine for a piece of ice or commodity that has been sold out, or is not present, the accumulator will be set up. Then if the push button switch is closed, a circuit will be established through the proper track switch 263 to the proper relay coil 10, 20 or 25 to disestablish the vending circuit and establishing a circuit through the reset circuit and switch U for resetting the accumulator and returning the coin or coins.

If improper coins or improper groups of coins are inserted in the coin box, the accumulator will be set up for establishing a circuit through the resetting coil 55 and the solenoid return coil for returning the coins when the push button switch is closed; no current being established to a vending circuit.

Should the curent in the coin box be off, all coins inserted would be rejected just as would occur if coins were inserted during a vending operation when only the 110 volt circuit that supplies the current for the motors is alive and the 24 volt circuit is cut out by the mercury switch e.

From the foregoing, it will be apparent that a very efficient vending machine has been provided that is provided with all necessary safeguards to return the customers' money if they do not obtain a commodity and which is designed to accept a fraction of the total cost of an article and facilitate the use of different coins.

We are aware that many changes may be made and various details of construction may be modified without departing from the principles of this invention, and we do not propose limiting the patent granted thereon otherwise than necessitated by the prior art and appended claims.

We claim as our invention:

1. In a vending machine, a circuit selector including an arm, delivery means including a plurality of article delivery control circuits connected to said selector, a selector resetting circuit, coin controlled means including electrical circuits for moving said arm step by step and a switch having electrical conducting means connected with said selector and adapted for forming an electrical connection with said delivery circuits or said resetting circuit in accordance with the position of said arm.

2. In a vending machine, a circuit selector including an arm, means including coin controlled circuits for moving said arm step by step, a coin returning means including a switch having a circuit connected with said selector and adapted for forming a connection with said arm, and an arm resetting means having a circuit with a plurality of connections with said selector and adapted to be energized when said arm is in one of a number of predetermined positions.

3. In a vending machine, delivery mechanism including a motor, an electrical circuit for said motor including a normally open switch, a coin box, coin controlled electrical means therein including a secondary circuit for controlling said switch, manually operable means for establishing said secondary circuit for closing said switch and simultaneously operable means for shutting off the secondary current in said coin box when said motor circuit is established.

4. In a vending machine, a coin box having a normally live circuit therein, means including an electromagnet in said circuit for controlling the descent of coins in said box, vending mechanism, operating means for said vending mechanism, means including said live circuit for starting said operating means, and switch means in the live circuit automatically operated for shutting off said normally live circuit when said operating means is started for changing the descent of coins in said box.

5. In a vending machine, a pair of relatively movable switch members adapted for establishing different circuits, means including an electromagnet for moving one member by uniform steps according to a unit coin value, a plurality of different coin controlled electrical circuits having a common branch containing said electro-magnet and means in one of said coin controlled circuits for imparting as many separate electrical impulses to said electro-magnet as there are unit coin values in the coin adapted for controlling said circuit and a source of energy for said circuits.

6. In a vending machine, a pair of relatively movable switch members adapted for establishing a plurality of different circuits, means including an electro-magnet for moving one of said members by uniform steps according to a unit coin value, a stationary electrical conductor having contact with said movable member in all positions, a plurality of different value coin controlled circuits having a common branch containing said electro-magnet, means in certain of said coin controlled circuits for imparting as many separate electrical impulses to said electro-magnet as there are unit coin values in the coins adapted to control said certain circuits, and a source of energy for said circuits.

7. In a vending machine, an accumulator consisting of an insulated plate having spaced contacts, a step up arm adapted for engaging said contacts, means including an electro-magnet for moving said arm step by step, a plurality of coin controlled circuits having a common branch containing said electro-magnet and means in certain of said circuits for imparting uniform electric impulses through said electro-magnet in accordance with the number of unit coin values contained in the coins adapted to control said circuits and a source of energy for said circuits.

8. In a vending machine, an accumulator comprising an insulated plate having spaced contacts, a rotatable shaft, an electrical conducting arm secured on said shaft and adapted for engaging said contacts, a conducting ring surrounding said shaft and insulated therefrom and in contact with said arm, and means for rotating said shaft step by step including an electro-magnet and a plurality of coin controlled circuits in circuit with said magnet and means for supplying energy to said circuits.

9. In a vending machine, vending mechanism including a motor and a circuit therefor having a normally open switch, an electro-magnet for controlling said switch, a secondary circuit containing said electro-magnet, a normally closed switch in said secondary circuit controlled by said electro-magnet, a pair of normally open switches in said secondary circuit, and coin controlled means for closing one of said last mentioned switches and manually operated means for closing the other for energizing said electro-magnet for closing said switch and simultaneously opening said closed switch in said secondary circuit.

10. In a vending machine, vending mechanism including a motor and a circuit therefor having a normally open switch, means including an electro-magnet for controlling said switch, a secondary circuit containing said electro-magnet, a normally closed switch in said secondary circuit also controlled by said means, a coin box housing enclosing a portion of said secondary circuit, coin chutes in said housing, means associated with said coin chutes for controlling the descent of coins in said chutes including a solenoid in said secondary circuit, and switch means in said secondary circuit operable for causing energization of said secondary circuit for closing said motor switch and simultaneously opening said closed switch for the purpose set forth.

11. In a vending machine, a commodity conveying mechanism, a switch normally maintained in open position by said commodity, coin controlled means for controlling said mechanism including a step up arm, resetting means for said arm including an electro-magnet having a connection with said switch, and adapted to be energized when said switch is closed through the absence of commodities for resetting said arm.

12. In a vending machine, a step up switch member, resetting means therefor including an electro-magnet, an electric circuit for said electro-magnet, a normally open switch in said circuit, a coin controlled means for operating said step up switch member, a coin return gate, means for opening said gate and simultaneously closing said switch for energizing said resetting circuit for the purpose set forth.

13. In a vending machine, a coin box having a normally live circuit therein, an accumulator switch in said box including a step up arm, means for imparting uniform steps to said arm including an electro-magnet, a coin controlled circuit having connections with said live circuit and said electro-magnet for imparting electrical impulses to said magnet, and resetting means for said arm adapted to be operated upon the insertion of incorrect coinage in said box.

14. In a vending machine, vending mechanism including a motor, controlling means for the motor, a coin return chute, a gate therefor, electrical operating means connected to said gate, a switch in circuit with said controlling means and said operating means, and coin controlled means for operating said switch for establishing a circuit to said controlling means or said operating means depending upon whether the correct or incorrect amount of coinage has been deposited in said machine.

15. In a vending machine, vending mechanism including a motor, a step up switch mechanism including an arm, means for moving said arm step by step including coin controlled circuits for establishing a connection to said motor, resetting means for said arm, an electrically operated coin discharge gate and means responsive to the completion of a vending operation for operating said resetting mechanism and said gate.

16. In a vending machine, a plurality of vending units, an electrical control for each unit, a coin box having a plurality of coin chutes adapted for receiving coins of different values, a stationary switch plate having a connection with each of said electrical controls, a step up switch member adapted for cooperation with said switch plate for engaging any of said connections, means including an electro-magnet for moving said arm step by step, electrical coin controlled circuits one for each coin chute having a connection with said electro-magnet for energizing the same, and means in certain of said coin controlled circuits for causing uniform electrical impulses to be imparted to said electro-magnet.

17. In a vending machine, a coin box having a plurality of coin chutes for coins of different values, a coin controlled circuit associated with each chute, a selector mechanism, means in said circuits for operating said selector, a rotatable electrical impulse producing drum connected in said circuits, and a motor in said circuits connected to said drum for rotating the same for the purpose set forth.

18. In a vending machine, a coin box having a plurality of coin chutes adapted for receiving coins of different values, a coin controlled circuit associated with each chute, a circuit selector mechanism, means including an electro-magnet in said circuits for setting said selector mechanism, a rotatable electrical impulse producing drum in said circuits, a motor in said circuits connected to said drum for rotating the same for imparting electrical impulses to said electro-magnet, and means associated with said drum for automatically breaking the circuit through the motor when the drum has rotated a predetermined distance.

19. In a vending machine, a coin box having a normally live circuit therein, a plurality of coin chutes in said box and adapted for receiving coins of different values, a coin controlled circuit associated with each chute and having connections with said live circuit, a selector mechanism, means in said circuits for setting said selector mechanism, in combination with a vending mechanism including a motor, a circuit for the motor having a normally open switch, an electro-magnet for controlling said switch, a secondary circuit containing said electro-magnet, and said selector mechanism and having connections with said live circuit, and a manually operable switch in said secondary circuit adapted for closing said secondary circuit when said selector mechanism has been set.

20. In a vending machine, a coin box having a normally live circuit therein, a coin controlled circuit having connections with said live circuit, an accumulator switch including a step up arm, means including an electro-magnet in said coin controlled circuit for moving said arm by uniform steps, in combination with a vending mechanism including a motor, means including an electro-magnet for controlling said motor, a secondary circuit containing said accumulator switch and said last mentioned electro-magnet and having connections with said live circuit, means in said coin controlled circuit for imparting successive electrical impulses to said first mentioned electro-magnet for setting said switch and a manually operable switch in said secondary circuit for closing the same when said accumulator switch is set.

21. In a vending machine, a pair of relatively movable switch members, means for moving one member relative to the other member by substantially equal steps each corresponding to the same unit coin value including an electro-magnet, a coin controlled circuit containing said electro-magnet, an electrical impulse producing drum in said circuit and a motor in said circuit geared to said drum for the purpose set forth.

22. In a vending machine, a pair of relatively movable switch members adapted for setting up a control circuit for vending mechanism, means for moving one member by uniform steps of a unit coin value including an electro-magnet, a plurality of coin controlled circuits connected to said electro-magnet and rotatable impulse producing means connected in said circuits for imparting spaced impulses to said electro-magnet when a coin has been inserted in the machine for causing the closing of one of said circuits.

23. In a vending machine, a plurality of vending units adapted for delivering different priced articles, an electrical control for each unit, a selector switch having spaced electrical conductors connected to said controls and means for setting said switch in circuit with any one of said controls comprising an electro-magnet, a plurality of coin controlled circuits including said electro-magnet and an electrical impulse producing apparatus in said circuits for the purpose set forth.

24. In a vending machine, a vending mechanism, an electrical control therefor, a secondary circuit containing said control, an accumulator switch in said circuit, and comprising an arm, means for moving said arm by uniform steps in accordance with a unit coin value including an electro-magnet, a coin controlled circuit containing said magnet and a rotatable impulse producing device in said circuit and a manually operable normally open switch in the secondary circuit adapted for closing the same when said accumulator switch has been set.

25. In a vending machine having a plurality of coin chutes, a plurality of vending units adapted for delivering different priced articles, an electrical control for each unit, a plurality of coin controlled circuits, one for each control, a switch adapted to be adjusted for establishing a circuit for any of said controls and means responsive to the insertion of a coin in any of said coin chutes for adjusting said switch step by step for the purpose set forth.

26. In a vending machine having a plurality of coin chutes, a plurality of vending units adapted for delivering different priced articles, an electrical control for each unit including a circuit, a plurality of coin controlled circuits, one for each control, a switch mechanism including an arm adapted to be moved by uniform steps according to a unit coin value for establishing one of the control circuits, means responsive to the insertion of a coin in any of said coin chutes for moving said arm one or more steps and a manually operable switch common to the control circuits for closing each when established by said switch.

27. In a vending machine having a plurality of coin chutes, a plurality of vending units adapted for delivering different priced articles, an electrical control for each unit, a plurality of coin controlled circuits, one for each unit, a selector switch having spaced contacts, each connected to one of said controls, said switch comprising a movable arm, conducting means always in contact with said movable arm for completing circuits to said controls, means responsive to the insertion of a coin in any of said coin chutes for moving said arm one or more steps for setting said switch in circuit with the desired control, and a manually operable switch in said conducting means adapted for closing the established control circuit.

28. In a vending machine, a switch plate having contacts, vending units having controls connected to certain of said contacts, a rotatable arm cooperating with said plate for engaging any of said contacts, resetting means for said arm, and means for causing operation of said resetting means when said arm engages other than said certain contacts on said plate.

29. In a vending machine, a switch plate having spaced contacts thereon, vending units having controls electrically connected to certain of said contacts, a rotatable switch arm cooperating with said plate for engaging any of said contacts, coin controlled means for moving said arm step by step, electrically controlled resetting means for said arm, means for causing operation of said resetting means when said arm engages other than said certain contacts, a coin return gate and electrical means for opening said gate when said arm has been reset.

30. In a vending machine, a movable switch member, resetting mechanism therefor, a coin return chute, a gate for controlling the descent of coins into said chute, means including a coin controlled circuit for moving said member step by step, and means responsive to the use of incorrect coinage in causing said circuit for causing operation of said resetting means and said gate.

JOSEPH JETSECK.
FRED W. JACH.